United States Patent
Maglio et al.

(10) Patent No.: US 8,551,328 B2
(45) Date of Patent: Oct. 8, 2013

(54) ORGANIC CHLORIDE ADSORBENT

(75) Inventors: Alfonse Maglio, River Edge, NJ (US); Richard T. McCaffrey, Scotch Plains, NJ (US)

(73) Assignee: BASF Corporation, Florham Park, NJ (US)

( * ) Notice: Subject to any disclaimer, the term of this patent is extended or adjusted under 35 U.S.C. 154(b) by 189 days.

(21) Appl. No.: 13/167,770

(22) Filed: Jun. 24, 2011

(65) Prior Publication Data

US 2012/0190906 A1    Jul. 26, 2012

Related U.S. Application Data

(60) Provisional application No. 61/434,488, filed on Jan. 20, 2011.

(51) Int. Cl.
*C07C 7/13* (2006.01)

(52) U.S. Cl.
USPC ......................... 208/262.1; 585/820; 585/823

(58) Field of Classification Search
None
See application file for complete search history.

(56) References Cited

U.S. PATENT DOCUMENTS

| | | | | |
|---|---|---|---|---|
| 3,045,055 | A * | 7/1962 | Van Pool et al. | 208/141 |
| 3,862,900 | A | 1/1975 | Reusser | |
| 4,832,821 | A | 5/1989 | Swan, III | |
| 4,867,864 | A | 9/1989 | Dessau | |
| 5,107,061 | A * | 4/1992 | Ou et al. | 585/823 |
| 5,792,897 | A * | 8/1998 | Rosser et al. | 585/738 |
| 5,952,541 | A * | 9/1999 | Ou et al. | 585/823 |
| 2006/0102520 | A1 * | 5/2006 | Lapinski et al. | 208/138 |
| 2009/0163759 | A1 | 6/2009 | Driver et al. | |
| 2010/0018900 | A1 * | 1/2010 | Krupa et al. | 208/133 |

FOREIGN PATENT DOCUMENTS

JP    03099024    4/1991

* cited by examiner

*Primary Examiner* — Tam M Nguyen
(74) *Attorney, Agent, or Firm* — Bernard Lau

(57) ABSTRACT

Chemically combined chlorides are removed from intermediate and product streams of a hydrocarbon reforming process by contacting the streams with zeolite 13X, having a Si/Al ratio of less than 1.25.

16 Claims, 1 Drawing Sheet

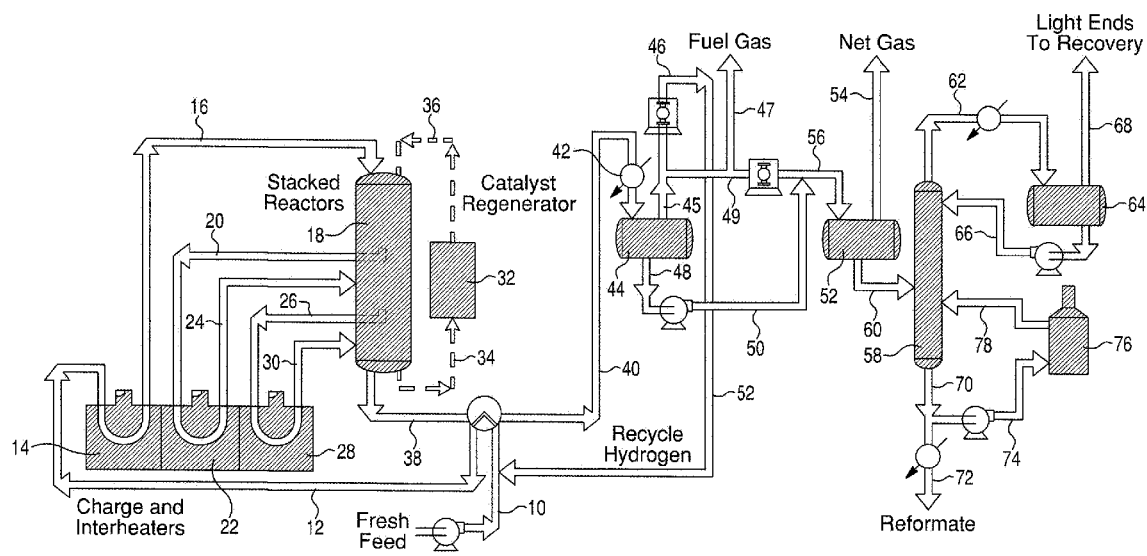

ORGANIC CHLORIDE ADSORBENT

CROSS-REFERENCE TO RELATED APPLICATIONS

This application claims priority to U.S. Ser. No. 61/434,488, filed Jan. 20, 2011.

FIELD OF THE INVENTION

The present invention relates to the removal of organic chlorides from refinery streams. More particularly, the present invention relates to the removal of chemically-combined halogens, such as chlorine, and more specifically organochlorides, from refinery streams including hydrocarbons and/or hydrogen. Specifically, the present invention is directed to the removal of organochlorides from streams in a catalytic reforming unit using molecular sieves having a specified Si/Al ratio.

BACKGROUND OF THE INVENTION

The removal of halogens, and particularly chemically-combined halogens, such as organochlorides, from refinery streams is highly desirable in order to prevent significant equipment corrosion and impurity problems in downstream processing. This is particularly useful in a catalytic reforming unit which contains a bi-functional catalyst with acid function delivered from chlorided alumina. The chloride level of this catalyst must be maintained by constant addition of a chloriding agent, and chlorides continuously leach off the catalyst into the product streams.

Reforming is a process generally known to the petroleum industry as a process for the treatment of naphtha fractions of petroleum distillates to improve their octane rating by producing aromatic components from components present in the naphtha feedstock. Reforming is a complex process and involves a number of competing processes or reaction sequences. These include dehydrogenation of cyclohexanes to aromatics, dehydroisomerization of alkylcyclopentanes to aromatics, dehydrocyclization of an acyclic hydrocarbon to aromatics, and hydrocracking of paraffins to light products boiling outside the gasoline range. In addition, the dealkylation of alkylbenzenes and the isomerization of paraffins occur in reforming processes. Some of the reactions occurring during reforming are not desirable owing to their deleterious effect on the yield of commercially valuable products or upon the octane of the products. For example, hydrocracking reactions produce light paraffin gases, e.g., $C_1$-$C_4$, and reduce the yield of products boiling in the gasoline range.

The interest in catalytic reforming processes is fueled by a desire to improve the production (yield) of the gasoline fraction while concurrently increasing its octane.

Naphtha reforming may also be utilized for the production of benzene, toluene, ethylbenzene and xylene aromatics. A valuable by-product of naphtha reforming is hydrogen, which may be utilized for hydrotreating and upgrading of other hydrocarbon fractions. Generally, the molecular rearrangement of molecular components of a feed, which occurs during reforming, results in only slight, if any, changes in the boiling point of the reformate (the product of reforming), compared to that of the feed. Accordingly, reforming differs from both cracking and alkylation, both refinery processes, each of which does result in changes of boiling range of the product compared to the feed. That is, in cracking, large molecules are cracked into smaller ones; whereas, in alkylation small molecules are rebuilt into larger molecules.

The most important uses of the reforming process are briefly mentioned: the primary use of catalytic reforming may be concisely stated to be an octane upgrader and a route to premium gasoline.

Catalytic reforming is the only refining process that is capable of economically making a gasoline component having high clear research octane ratings. The charge to the reformer (straight-run, thermal, or hydrocracker naphtha) is usually available in large quantities and is of such low quality that most of it would be unsaleable without reforming.

Hydrogen, although often considered a by-product, is still a valuable output from the reformer. Normally, it is produced in amounts ranging from 300 to 1200 SCF/Bbl, depending on the type of feed stock and reformer operating conditions. Reformer hydrogen is used to remove unwanted contaminants from reformer feed stocks, for hydrodesulfurization of distillates, hydrocracking of heavy fractions, hydrotreating of lubes and various chemical operations.

All of the reforming catalysts in general use today contain platinum supported on an alumina or an alumina-silica base. In many cases, rhenium is combined with platinum to form a more stable catalyst which permits operation at lower pressures. Platinum is thought to serve as a catalytic site for hydrogenation and dehydrogenation reactions and halogenated alumina provides an acid site for isomerization, cyclization, and hydrocracking reactions. Halide, particularly chloride, is known to be a catalyst promoter when added to a reforming catalyst in catalyst-promoter quantities. While most feeds contain small amounts of halide, it is usually not enough to adequately maintain catalyst activity. Consequently, platinum-containing alumina-based reforming catalysts are manufactured having a predetermined amount of halide, particularly chloride, on catalyst, sometimes up to about 3 wt. %, depending on the active metals content of the catalyst. As the catalyst ages, chloride loss becomes appreciable and, inter alia, contributes to loss of catalyst activity. Various approaches have been taken to address the need for maintaining desirable levels of halide on catalyst, as well as preventing its loss when onstream. Typically, dry halide, in the form of a halogen, halide acid, or an alkyl halide, is injected into one or more series reactors to maintain the halide concentration within the desired range.

Hydrogen is an important by-product from the reforming reaction. Part of the hydrogen stream is recycled and typically the chloride level of this stream is monitored as an indicator of the chloride on the catalyst. Since the reformer generates an excess of hydrogen, a net-hydrogen stream is produced from the reformer. Thus, two chloride-containing streams are produced from the reformer, e.g. net-hydrogen and the reformed naphtha. Net-hydrogen is utilized in many parts of the refinery, as above described and, thus, the net-hydrogen stream is treated to remove the chloride contaminants. Removal of chlorides from the hydrogen stream represents the majority of applications for chloride removal.

The chlorides are generally in the inorganic form, HCl. However, some refiners have reported organic chlorides as well. Since trace levels of $C_2$ to $C_4$ olefins are present in the hydrogen stream, these organic chlorides are presumed to be $C_2$ to $C_4$ chlorinated hydrocarbons such as ethyl chloride, propyl chloride, butyl chloride, vinyl chloride, etc. The levels of these chloride species can vary greatly, but are typically 1-10 ppmv. Inorganic chlorides are very corrosive and can cause significant operating issues in any downstream equipment. Organic chlorides, while not particularly corrosive, decompose at relatively low temperatures to HCl and the corresponding hydrocarbon. Thus, these organic chlorides are suspect when corrosion is observed in streams where the inorganic halides have been removed.

Refiners typically abate the chloride compounds by passing process streams through a fixed bed of adsorbent with specificity for the contaminants of interest. Inorganic chlorides are effectively removed to levels well below 1 ppm using aluminas promoted with alkali (U.S. Pat. No. 5,316,998). In contrast, organic chlorides are more difficult to remove and there is limited evidence of an effective adsorbent in the literature. U.S. Pat. No. 3,862,900 teaches that molecular sieves, especially type 13X, have an affinity for organic chlorides and can be utilized in an adsorption system to effectively separate organic chlorides from a process stream. Reformate process streams are not mentioned as the adsorbent is described as particularly useful to adsorb chemically combined chlorine from hydrocarbon streams produced by the catalytic alkylation of an olefin with an isoparaffin in the presence of a metal chloride catalyst. The Si/Al ratio of said 13X adsorbent is 106:86, or 1.23. In addition, sales literature from companies such as CLS Industries and UOP claim their molecular sieve products are useful in removing organic chlorides from various refinery process streams. Since no mention of Si/Al ratio appears in these references, it must be assumed that these citings refer to a conventional zeolite 13X with a Si/Al mole ratio of 1.25 as defined in "Zeolite Molecular Sieves" by D. W. Breck, R. E. Krieger Publishing Co., 1984, page 316 and pages 278-284 in "Handbook of Molecular Sieves" by Rosemarie Szostak 1992 Van Nostrand Reinhold.

SUMMARY OF THE INVENTION

According to the invention, organic chlorides are removed from hydrocarbon and/or hydrogen streams by contacting the streams with a zeolite 13X molecular sieve for a time sufficient that the chemically combined chlorine is adsorbed onto the molecular sieves. It has been found that zeolite 13X molecular sieves having a Si/Al ratio of less than 1.25 have improved adsorption for organic chlorides relative to zeolite 13X having Si/Al ratios of 1.25 and higher.

In one embodiment of the invention, reformate and/or hydrogen steams catalytically produced by reforming a naphtha fraction in the presence of a reforming catalyst including a metal chloride, are contacted with the molecular sieve of this invention for a time sufficient to adsorb chemically combined chlorine, onto the molecular sieve.

BRIEF DESCRIPTION OF THE FIGURE

The sole FIGURE hereof is a simplified flow diagram showing a general reforming process unit comprised of serially connected reactor and related separation apparatus.

DETAILED DESCRIPTION OF THE INVENTION

The invention is particularly directed to a specific zeolite molecular sieve, which can be used as a chloride trap in several locations along a catalytic reforming unit. The specific configuration of the catalytic reforming unit is not critical to this invention. Reforming units in commercial practice usually differ as to the particular details of the reactor or reactors utilized and the train of reactor and separation units used to refine the product streams. However, in general, catalytic reforming units produce at least two main product streams, that being a substantially pure hydrogen stream which can be very useful in pretreatment of feed streams and in subsequent refinery processing, as well as a high octane reformate stream. The use of the zeolite molecular sieve of this invention to remove organic chlorides from the hydrogen stream and the reformate stream is particularly advantageous due to the improved adsorption that has been found. The FIGURE which illustrates a particular catalytic reforming process and unit is not intended to limit the invention to the specific reforming process as set forth, but is intended to show several of the product streams which are formed during the reforming process and which product streams can be improved by the removal of organic chlorides therefrom.

Feedstocks which are suitable for reforming typically are hydrocarbonaceous feedstock boiling in the gasoline range. Non-limiting examples of such feedstocks include the light hydrocarbon oils, boiling from about 70°-500° F., preferably from about 180°-400° F. Non-limiting examples of such feedstocks include straight run naphtha, synthetically produced naphtha, thermally or catalytically cracked naphtha, hydrocracked naphtha, or blends or fractions thereof.

Referring now to the FIGURE, an example of a catalytic reforming process can be illustrated. Thus, the feed directed from lines 10 and 12 is directed to the first heat exchanger 14, where upon the feed is brought to the proper temperature and directed to the top of the reforming reactor 18 via line 16. As illustrated in the FIGURE, reforming reactor 18 is a stacked reactor containing three beds of reforming catalyst which operate to reform the feedstock 10 by the dehydrogenation of cyclohexane and aromatics, dehydroisomerization of alkylcyclopentanes and aromatics, dehydrocyclization of an acyclic hydrocarbon to aromatics, hydrocracking of paraffins to light products boiling outside the gasoline range, the dealkylation of alkyl benzenes and the isomerization of paraffins. Again, it is to be understood that the stacked reactor system as shown is not critical to this invention, as a reforming unit can include other reactor configurations including a multiple of separate reactors to perform the reforming reactions known in the art. An example of such a refinery unit is disclosed in U.S. Pat. No. 4,832,821. Again, referring to the FIGURE, a product from the first catalyst stage leaves reactor 18 via line 20 and is again directed to a heat exchange unit 22, and returned to reactor 18 via line 24. Line 24 directs product from the first catalytic stage to a second bed of reforming catalyst for further reaction. Product from the second catalyst stage is removed from the reactor 18 via line 26. The second stage product is directed to a third heat exchanger 28 and again returned to the reactor 18 via line 30 to the third catalyst stage.

Catalysts suitable for use in the reforming reactor 18 herein include both monometallic as well as multimetallic reforming catalysts. Preferred are the bifunctional reforming catalysts comprised of a hydrogenation-dehydrogenation function and a cracking function. The cracking function, which is important for isomerization reactions, is thought to be associated with an acid-acting material of the porous, adsorptive, refractory oxide type which serves as the support, or carrier, for the metal component, usually a Group VIII noble metal, to which is generally attributed the hydrogenation-dehydrogenation function. Preferably the Group VIII noble metal is platinum.

The catalyst also contains a halide component which contributes to the necessary acid functionality of the catalyst. The halide may be fluoride, chloride, iodine, bromide, or mixtures thereof. Of these, chloride is particularly preferred in accordance with this invention. Generally, the amount of chloride is such that the final catalyst composition will contain from about 0.1 to about 3.5 wt. %, preferably about 0.5 to about 1.5 wt. % of chloride calculated on an elemental basis.

During the catalytic reforming process, there will be a consistent loss of chloride from the catalyst. Because of this loss of chloride, especially in the downstream reactors, chloride, and sometimes water, may be injected into any one of lines 16, 24 and 30, typically, at a molar ratio of about 20:1 to about 60:1 water to chloride to maintain the level of chloride on the catalyst at about 0.5 to 1.5 wt. %, preferably from about 0.7 to 1.1 wt. %, and more preferably from about 0.8 to about 1 wt. %. The addition of the chloride to the catalyst is not shown in the FIGURE. It is usual that both water and chloride be injected instead of chloride alone. Water is needed to adjust the chloride equilibrium in the reactor as well as to serve as an aid for keeping injection nozzles free from plugging by coke formation with chlorinated hydrocarbon injection. Conventional wisdom suggests that chloride be injected only in the lead or first stage reactor, as shown in the FIGURE, and carried downstream to the second and third stage catalyst beds. This suffers from the disadvantage that not enough chloride is left in the stream to maintain the desired level of chlorides throughout the reforming unit. If one tries to compensate for this by injecting still more chloride in the first stage bed, then overchlorination results, leading to undesirable high levels of cracking.

Referring again to the FIGURE, catalyst in the stacked reactor 18 may be regenerated in a catalyst regenerator 32. Thus, catalyst from rector 18 is passed via line 34 into the regenerator 32, which oxidizes any coke contained on the catalyst. Once oxidized, chloride is often added to the catalyst in the downstream section of the regenerator to rejuvenate the metal and acid functionality of the catalyst. Generally, the amount of chloride is such that the final catalyst composition will contain from about 0.1 to about 3.5 wt. %, preferably about 0.5 to about 1.5 wt. % of chloride calculated on an elemental basis. The regenerated and rejuvenated catalyst can be returned to the reactor 18 via line 36. Product from the reactor 18 leaves via line 38 for separation into a hydrogen product stream, light gas streams and the product reformate.

The separation configuration as shown in the FIGURE is meant to be exemplary only, as again, specific reforming units may have separation details which distinguish from that illustrated in the FIGURE. However, what would be common in all reforming units is a net largely pure hydrogen stream and an increased octane reformate product stream. Referring again to the FIGURE, product from reactor 18 is directed via lines 38 and 40 to the separation units. Initially, the product is directed from line 40 to a condenser 42, and then into a low pressure separation tank 44 where a light ends stream comprising hydrogen and light hydrocarbon gases is formed and leaves separation tank 44 via line 45. A small hydrogen recycle stream via line 46 is directed back to feed 10 via line 52. Often in reforming units, the hydrogen recycle stream is tested for chloride levels, so as to determine the chloride level that remains on the catalyst. Thus, depending on the target level of chlorides in the hydrogen recycle stream, additional chloride can be added to the catalyst as described above in accordance with the plant specifications. A low pressure fuel gas stream 47 containing hydrogen and light hydrocarbons ($C_1$-$C_4$) is drawn from line 45 via line 49. Fuel gas stream 47 can be used for heating in the reforming unit or else where in the refinery. A heavier product containing the reformate is directed from separator tank 44 via lines 48, and 50.

The heavier product taken from separator 44 via lines 48 and 50 and containing the product reformate is now directed to a high pressure separator 52 which separates a substantially pure hydrogen stream via line 54 from the reformate. This net-hydrogen stream, as described previously, is important for refinery operations and can be used for hydrogenation and pretreatment of the hydrocarbon feed, for hydrocracking of heavy fractions, hydrotreating various product streams and various other chemical operations in a refinery unit which would include a reforming unit as shown in the FIGURE. As shown in the FIGURE, a portion of the light gas, i.e. hydrogen and light hydrocarbon gases, from separator 44 can be added to separator 52 via line 56. The remaining product from separator 52, including light hydrocarbon ends and the reformate product is directed from separator 52 to a distillation column 58 via line 60. Distillation column 58 is operated to remove a light end product such as $C_4$-hydrocarbons from the top of distillation unit 58 via line 62. The light ends can then be directed to a separator unit 64 to allow recycling/reflux of heavier ends back to the distillation column 58 via line 66. The product light ends recovery including $C_4$-hydrocarbons and the like are removed from separator unit 64 via line 68. Reformate product, typically $C_{5+}$ is removed from the distillation column 58 via lines 70 and 72. A portion of the reformate product can be recycled to the distillation column via line 74, reboiler 76 and line 78 for further processing.

As discussed previously, it would be most useful to remove the organic chlorides from certain process streams of the catalytic reforming process. Thus, it is believed that the organic chlorides decompose to form HCl which is very corrosive to the reforming unit apparatus. Additionally, organic chlorides and HCl are contaminants in the product streams. In particular, the removal of chlorides, including organic chlorides from the substantially pure hydrogen product stream such as from line 54 as shown in the FIGURE, and the product reformate stream via line 72 would yield highly pure products which would not be contaminated by the chlorine species. Further, streams which can be treated using the molecular sieve of the invention can be the fuel gas stream such as shown via line 47 of the FIGURE, as well as the recycle hydrogen stream from line 52. The light ends recovery stream via line 68 can also be treated.

It has been found that the organic chlorides can be removed from hydrocarbon and/or hydrogen streams utilizing a molecular sieve comprising a zeolite X molecular sieve, and, in particular, zeolite 13X. Zeolite 13X is a wellknown material, has been described in the patent and scientific literature and is manufactured worldwide. In general, zeolite 13X is an alumino-silicate molecular sieve of the faujasite family. Surprisingly, it has been found that the Si/Al ratio of the zeolite 13X is important as to the effect the molecular sieve has on adsorbing the organic chlorides from the process streams. Typically, zeolite 13X is formed in the sodium form with a Si/Al ratio of 1.25. It has been found that if the Si/Al ratio of the zeolite 13X is less than 1.25, and, more particularly, less than 1.23, and, most preferably, less than 1.21, improved organic chloride adsorption is achieved. It is well known and understood that the minimum Si/Al ratio of zeolite X is 1.00. Zeolite 13X within the scope of this invention is commercially available such as from CWK, Bad Kostritz, Germany.

In the method of the invention, any suitable means for contacting the zeolite 13X molecular sieve with the hydrocarbon and/or hydrogen streams containing the chemically combined chlorine, e.g. organic chlorides is suitable. Presently preferred is a system of percolation in which the hydrocarbon or hydrogen to be treated is passed through a fixed bed of the molecular sieve in an amount and at a rate that will allow the suitable high utilization of the adsorbent. In general, an impure hydrocarbon or hydrogen stream containing chemically combined chlorine will be passed through the bed of zeolite 13X molecular sieve at an hourly rate of about 50 to 300 actual volumes of feed per volume of absorbent. For reasons of economics and efficiency, this range is preferably about 100 to 200 actual volumes of feed per volume of absorbent.

While the chemically combined chlorine targeted for removal via this invention is largely organically combined chlorine, there generally also are larger amounts of inorganically combined chlorides such as metal chlorides illustrated by aluminum chloride, sodium chloride, etc, as well as HCl. This invention effectively removes the chlorides whether they be organic or inorganic in nature.

Although some chemically combined chlorine can be removed by the process of this invention from hydrocarbons, hydrocarbon mixtures, and hydrogen containing relatively large amounts of chemically combined chlorine, it is obvious that the most efficient use of the treatment will be for hydrocarbon or hydrogen streams containing a relatively small amount of chemically combined chlorine. It has been found that when the hydrocarbon or hydrogen feed treated in accordance with this invention contains from about 0.001 to about 0.2 weight percent of chemically combined chlorine measured as chlorine and the process is carried out by passage through a bed of appropriately sized zeolite 13X molecular sieve at ambient temperature, the treatment results in the removal of about 85 percent and often as high as 100 percent of the chemically combined chlorine from the impure feed.

EXAMPLE

Experiments utilizing vinyl chloride as the model organic chloride compound and a variety of adsorbents have been tested, including alkali supported on alumina, zinc oxide, and several 13X type zeolites. All experiments have been run in gas phase, typically employing a mixture of nitrogen and helium to serve as inert gas surrogates for hydrogen. Low levels of vinyl chloride were added to the inert gases to approximate partial pressures (e.g., 0.00015 to 0.003 psia) typical of refinery applications for the purification of net-hydrogen streams. The adsorbents were loaded into an adsorber vessel and the vinyl chloride containing gas fed to the vessel at space velocities generally much higher than that of commercial applications so as to compress the time required for breakthrough, thus enabling more rapid experimentation. Outlet levels of vinyl chloride were determined using a calibrated Leco GC/TOFMS, capable of quantifying vinyl chloride to much less than 1 ppmv.

It was observed that two samples of commercial zeolite 13X, demonstrated much longer times for vinyl chloride breakthrough compared to two other 13X samples obtained from various sources. Longer adsorption times before contaminant breakthrough directly translates to higher capacity in service and longer product lifetimes. One commercial zeolite 13X sample had an Si/Al ratio of 1.15, compared to a typical conventional level of 1.25 (some references declare a range of 1.20 to 1.30). The Si/Al ratio of the other commercial sample was not reported. Solid State Silicon NMR testing was utilized to determine the Si/Al ratio of all samples and strongly supports the hypothesis of a direct correlation between Si/Al and adsorption performance. The Si/Al ratio as determined by NMR is shown in Table 1 and Table 2 with corresponding vinyl chloride capacities. The data in Table 1 reports testing at low partial pressures of vinyl chloride, typical of many commercial net gas hydrogen streams. The commercial zeolite 13X samples with Si/Al ratios of 1.17 and 1.20 have substantially higher vinyl chloride capacity compared to a third and fourth sample with a Si/Al ratio of about 1.3 and 1.35, respectively.

TABLE 1

| Adsorbent Description | BET Surface Area, m2/gm | Si/Al by Solid State Si NMR | Vinyl Chloride Capacity, wt % | Vinyl Chloride partial pressure, psia |
|---|---|---|---|---|
| Sample 1 | 534 | 1.17 | 3.4 | 0.000158 |
| Sample 2 | 525 | 1.20 | 4.0 | 0.000173 |
| Sample 3 | 537 | 1.28-1.35 | 2.11 | 0.000178 |
| Sample 4 | 531 | 1.32-1.38 | 2.3 | 0.000164 |

In another similar experiment, the vinyl chloride capacity of two 13X zeolite samples was determined at a higher partial pressure of vinyl chloride with data shown in Table 2. The vinyl chloride capacity of the low Si/Al ratio X zeolite (Sample 1) had more than twice the vinyl chloride capacity of a high Si/Al ratio X zeolite (Sample 4).

TABLE 2

| Adsorbent Description | BET Surface Area, m2/gm | Si/Al by Solid State Si NMR | Vinyl Chloride Capacity, wt % | Vinyl Chloride partial pressure, psia |
|---|---|---|---|---|
| Sample 1 | 534 | 1.17 | 7.7 | 0.00209 |
| Sample 4 | 531 | 1.32-1.38 | 3.4 | 0.00217 |

The invention claimed is:

1. In a process of refining a feedstream into at least one product and intermediate stream, and where at least one of the product or intermediate streams are treated to remove chlorides therefrom, the improvement comprising: removing the chlorides by contacting at least one of the product or intermediate streams with zeolite 13X having a Si/Al ratio of 1.0 to 1.20.

2. The improvement of claim 1, wherein said process of refining a feedstream comprises reforming a hydrocarbon feedstream in the presence of a reforming catalyst which includes a chloride component.

3. The improvement of claim 2, wherein said product stream comprises a substantially pure hydrogen stream and a reformate $C_{5+}$ product stream, at least one of said product streams being treated with said zeolite 13X to remove chlorides.

4. The improvement of claim 2, wherein said intermediate stream comprises a hydrogen recycle stream directed to said hydrocarbon feedstream, said hydrogen recycle stream being treated with said zeolite 13X for removal of chlorides.

5. The improvement of claim 2, wherein said hydrocarbon feedstream has a boiling point in the gasoline range.

6. The improvement of claim 2, wherein said reforming catalyst comprises a Group 8 noble metal on a refractory oxide support.

7. The improvement of claim 6, wherein said reforming catalyst comprises platinum on alumina.

8. The improvement of claim 7, wherein said reforming catalysts contains 0.1 to about 3.5 wt. % chloride, calculated on an elemental basis.

9. The improvement of claim 1, wherein at least one of said product or intermediate streams are passed through a fixed bed of said zeolite 13X.

10. The improvement of claim 1, wherein at least one of said product or intermediate streams are contacted with said zeolite 13X at ambient temperature.

11. The improvement of claim 9, wherein at least one of said product or intermediate streams are contacted with said zeolite 13X at ambient temperature.

12. The improvement of claim 1, wherein said zeolite 13X has a Si/Al ratio of 1.17-1.20.

13. The improvement of claim 2, wherein said intermediate stream includes a fuel gas stream containing hydrogen and light hydrocarbons.

14. The improvement of claim 3, wherein both of said product streams are treated with said zeolite 13X to remove chlorides.

15. The improvement of claim 1, wherein said chlorides being removed are organochlorides.

16. The improvement of claim 2, wherein said zeolite 13X has a Si/Al ratio of 1.17-1.20.

* * * * *